United States Patent
Giraud

(10) Patent No.: US 7,725,942 B2
(45) Date of Patent: May 25, 2010

(54) METHOD FOR LOADING AND CUSTOMIZING DATA AND PROGRAMMES LOADED IN A SMART CARD

(75) Inventor: Jean-Luc Giraud, London (GB)

(73) Assignee: Gemalto SA, Gemenos (FR)

( * ) Notice: Subject to any disclaimer, the term of this patent is extended or adjusted under 35 U.S.C. 154(b) by 994 days.

(21) Appl. No.: 10/416,181

(22) PCT Filed: Nov. 14, 2001

(86) PCT No.: PCT/FR01/03563

§ 371 (c)(1),
(2), (4) Date: May 9, 2003

(87) PCT Pub. No.: WO02/41267

PCT Pub. Date: May 23, 2002

(65) Prior Publication Data

US 2004/0013266 A1    Jan. 22, 2004

(30) Foreign Application Priority Data

Nov. 14, 2000    (FR) ................................. 00 14633

(51) Int. Cl.
*G06F 15/00* (2006.01)
*G06F 17/30* (2006.01)
(52) U.S. Cl. .............................. 726/26; 726/27; 718/100
(58) Field of Classification Search .................. 726/26, 726/27; 718/100
See application file for complete search history.

(56) References Cited

U.S. PATENT DOCUMENTS

| | | | | | |
|---|---|---|---|---|---|
| 4,493,073 | A | * | 1/1985 | Witmore et al. | 370/244 |
| 4,742,215 | A | * | 5/1988 | Daughters et al. | 235/487 |
| 4,862,501 | A | * | 8/1989 | Kamitake et al. | 713/172 |
| 5,410,690 | A | | 4/1995 | Kawata | |
| 5,452,431 | A | * | 9/1995 | Bournas | 711/115 |
| 5,727,230 | A | * | 3/1998 | Fujioka | 710/5 |
| 5,917,168 | A | * | 6/1999 | Nakamura et al. | 235/379 |
| 5,923,884 | A | * | 7/1999 | Peyret et al. | 717/167 |
| 6,005,942 | A | * | 12/1999 | Chan et al. | 713/187 |
| 6,097,967 | A | * | 8/2000 | Hubbe et al. | 455/558 |
| 6,357,665 | B1 | * | 3/2002 | Peachman et al. | 235/492 |
| 6,694,436 | B1 | * | 2/2004 | Audebert | 726/9 |
| 6,931,379 | B1 | * | 8/2005 | Sato et al. | 705/50 |
| 7,117,364 | B1 | * | 10/2006 | Hepper et al. | 713/176 |

FOREIGN PATENT DOCUMENTS

EP    0798673 A1    10/1997
WO    WO 9910848    3/1999

* cited by examiner

*Primary Examiner*—Kambiz Zand
*Assistant Examiner*—William S Powers
(74) *Attorney, Agent, or Firm*—Buchanan Ingersoll & Rooney PC

(57) ABSTRACT

A method for loading data and programs in the memory of an electronic component includes a first phase in which data is loaded in the memory of the component. A validation phase then verifies the data loaded in the component memory. A second phase of loading data in the memory is carried out only if the data loaded during the first loading phase is valid. The second phase includes at least a step in which data is loaded and then validated.

14 Claims, 2 Drawing Sheets

METHOD FOR LOADING AND CUSTOMIZING DATA AND PROGRAMMES LOADED IN A SMART CARD

This disclosure is based upon French Application No. 00/14633, filed on Nov. 14, 2000 and International Application No. PCT/FR01/03563, filed Nov. 14, 2001, the contents of which are incorporated herein by reference.

BACKGROUND OF THE INVENTION

The present invention relates to portable electronic objects such as electronic microcircuit cards, known as smart cards. It applies more generally to any independent embedded device provided with a processing unit associated with program and data memories, and a communication module with or without contact for being connected with an electronic device comprising reading and/or writing means. Program and data memories generally comprise a memory of the read only or non-rewriteable type but which is programmable only once at the time of its manufacture, for example of the ROM (Read Only Memory) type, and a volatile memory accessible in write and read mode, for example of the RAM (Random Access Memory) type, and used for storage of temporary data during the execution of a program. Some chips also comprise a non-volatile memory, accessible both in read and write mode, for example of the EEPROM (Electrically Erasable Programmable Read Only Memory) or FLASH type.

Such devices are designed to be connected to electronic systems in order to fulfil with them particular functions in the context of one or more applications. Generally these applications (bank, communication, health) require a high level of security against fraudulent usage.

The manufacture of smart cards comprises several phases, each involving different participants. Thus the first phase concerns the creation of a chip itself, which is done by the manufacturer of the electronic component. In some cases the manufacturer also carries out an initialisation of the chip consisting in loading into the ROM memory of the chip a program for loading the utilisation program and other information, some of which are specific to each card, such as a serial number.

The following phase of manufacturing a smart card concerns the embedding of the chip. This phase is carried out by an entity called an embedder, which loads other information into the card, some also being generic, such as that permitting the creation of a system of files in the non-volatile memory, and others specific to the final use of the card (for example a module serial number).

Finally, the last manufacturing phase is carried out by an entity called a personaliser, whose role is to load into the non-volatile memory the information specific to each user (information identifying the bearer of the card, and passwords), as well as other generic information.

Generally, the tools used during each of these phases are different. Each chip manufacturer applies an initialisation method which is peculiar to him. The card embedder which loads some information in the non-volatile memory of the component uses commands, known as physical commands, which require knowledge of the physical organisation of the memory of the chip (the address of the files etc). The personalisation phase uses so-called logic commands which require knowledge of the logical organisation of the memory, for example the name of the directories and the names of the files which are stored therein.

The physical commands are very rapid and very flexible. Because of this, they are very dangerous since they are not subjected to checks. By virtue of these commands, an ill-intentioned person could for example create corrupted file structures preventing the normal functioning of the chip, whilst it is personalised, or load therein programs enabling secret information to be recovered, such as keys or access codes contained in the memories of the component.

Logic commands protect against this type of attack but are on the other hand very slow, which has an influence on the time necessary for the personalisation of the cards and therefore on the cost of the cards.

In addition, the coexistence of these two types of command requires the operating system of a chip to perform additional verification operations, which further extends the time required for producing the cards whilst not guaranteeing the integrity of the data written in the memory of the component.

SUMMARY OF THE INVENTION

The aim of the present invention is to eliminate these drawbacks.

To this end, it proposes a fast and secure loading and personalisation method making it possible to load information and programs in the memory of an electronic component.

According to the invention, this method is characterised in that it comprises:

a first phase of loading information into the memory of the component, a validation phase comprising the verification of the information loaded into the memory of the component, and a second phase of loading information into the memory of the component, performed solely if the information loaded during the first loading phase is valid, this second phase comprising at least one step of loading information and validating this information.

By virtue of these provisions, the method according to the invention uses only physical commands which are rapid for loading the major part of the non-volatile memory of the component, these commands being accompanied by security mechanisms for guaranteeing the integrity of the data loaded into the memories of the component.

Advantageously, the validation phase comprises the determination by a processing unit of the component of a value characteristic of the information loaded during the first loading phase, the comparison of the characteristic value calculated with a value previously transmitted to the processing unit, and the validation of the information loaded into the memories of the component if the characteristic value calculated corresponds to that which was transmitted.

The said characteristic value may be a condensed value of the information loaded during the first loading phase. Thus it may be obtained by applying a hash function to the information loaded during the first loading phase.

The said characteristic value can also be an MAC code obtained by applying a hash function to the information loaded during the first loading phase and by involving a secret key which was previously loaded into the memory of the component. In this way the first loading phase can be performed only by an authorised person who knows the secret key.

According to one particularity of the invention, this method comprises a preliminary phase comprising the introduction into the memory of the component of addresses of predefined areas of the memory in which information can be written during the second loading phase, and at least one value characteristic of the information liable to be loaded during the first loading phase.

According to another particularity of the invention, the second information loading phase is performed by transmitting to the component at least one logic write command associated with information to be loaded into the memory of the component.

Alternatively, each information loading step performed during the second loading phase can advantageously comprise the transmission of a physical write command comprising information to be loaded into the memory of the component and a value characteristic of the write command, the determination by a processing unit of the component of a characteristic value applied to the write command, the comparison of the characteristic value received with that which was calculated, and the validation of the write command if the comparison has not revealed any difference.

Each physical write command can be encrypted. The data are then deciphered by means of a secret key which was previously loaded into a memory of the component.

According to another particularity of the invention, each command to write information implemented during the second loading phase is associated with the value of a counter which is incremented at each command, this value being verified by the processing unit, which rejects a command if the value of the associated counter does not correspond to the expected value.

At the end of the first loading phase, provision can be made for transmitting an end of loading phase to the component, which has the effect of triggering the validation phase.

Each command transmitted to the processing unit can be associated with a signature, the processing unit accepting this command only if the signature received corresponds to a signature resulting from a calculation which it applied to the end of loading command.

The method according to the invention can comprise several cycles each comprising a first loading phase, a validation phase and a second loading phase, each loading cycle relating only to a respective memory area, distinct from those loaded during other loading cycles.

BRIEF DESCRIPTION OF THE DRAWINGS

One method for implementing the method according to the invention will be described below, by way of non-limiting example, with reference to the accompanying drawings, in which.

DETAILED DESCRIPTION

Figure 1:
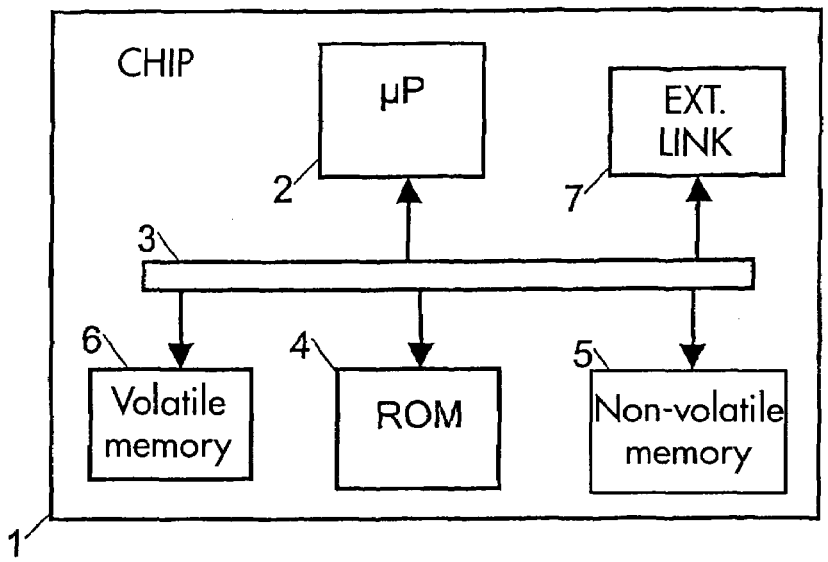
FIG. 1 depicts schematically the electronic component of a smart card.

FIG. 1 shows an electronic component 1 designed to be integrated into a so-called intelligent smart card. This component generally comprises a processing unit 2 or microprocessor, connected by a communication bus 3 to memories 4, 5, 6, and to a link 7 to a reading and possibly writing terminal. This connection consists either of contact areas in the case of a smart card with contacts, or an antenna in the case of a contactless smart card. These memories comprise a non-erasable memory 4, for example of the ROM type, a non-volatile memory 5 accessible in write and read mode, for example of the EEPROM or FLASH type, and a volatile memory 6 or RAM.

Figure 3:
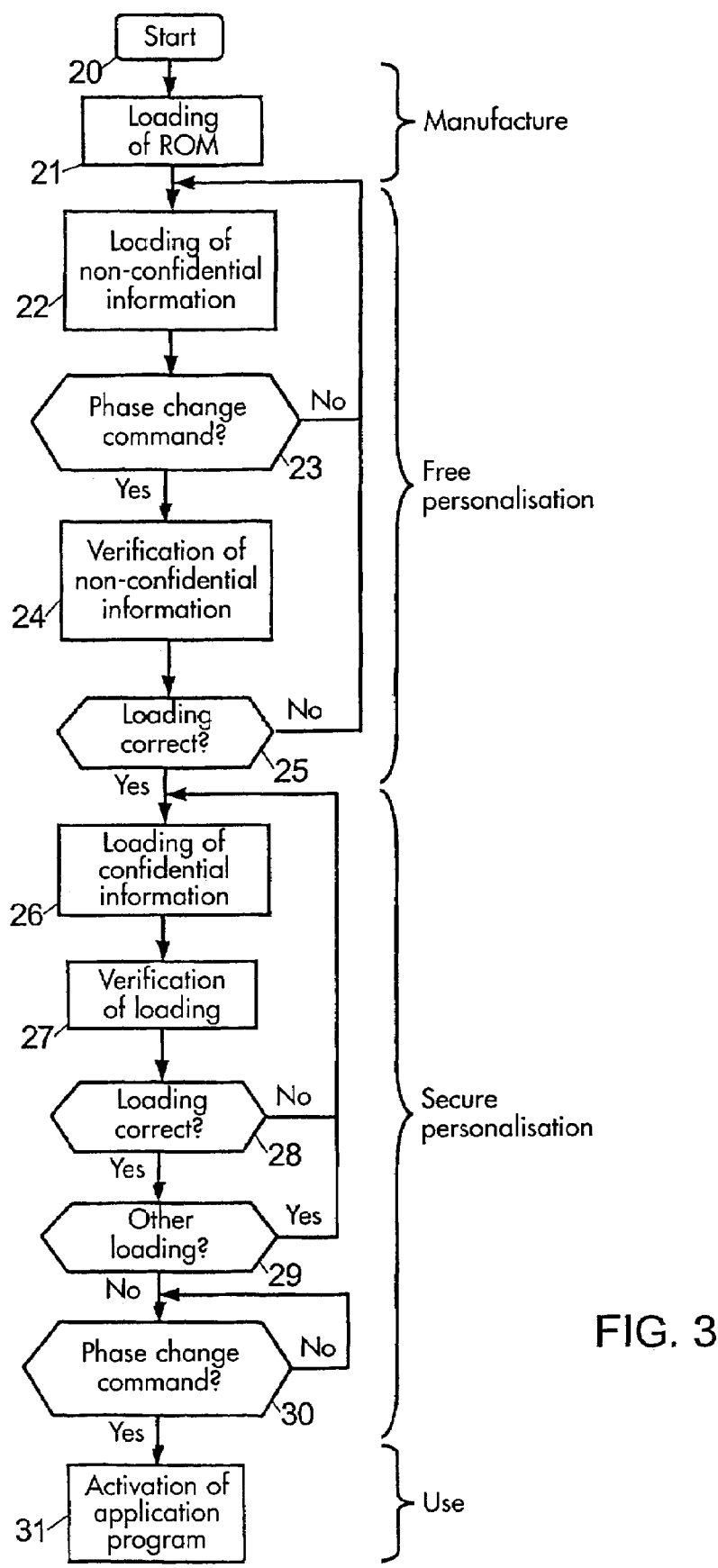
FIG. 3 shows the concatenation of the various steps of the method according to the invention in the form of a flow diagram.

In accordance with the method according to the invention 20 illustrated in FIG. 3, an initialisation processing 21 performed at the time of its manufacture is first of all applied to the electronic component. This processing consists in writing in the memory 4 a program permitting the loading of the non-volatile memory, as well as confidential information, such as a serial number and possibly a secret key, which can alternatively be determined according to the serial number.

Next the component 1 is delivered to the card embedder, which in particular carries out a first phase 22 of loading the common or non-confidential data into the non-volatile memory 5 by means of the loading program stored in the memory 4 and using so-called physical, non-secure, commands which are transmitted to the microprocessor 2 by means of a personalisation terminal. The loading program carries out only a check of the addresses where the data are written. These can therefore be written in any order. It is even possible to write several times to the same addresses in the memory 5.

During this phase, it is possible to authorise the reading of the content of the memory 5 for the purpose of verification but, if a high level of security is required, such a reading may be inhibited, the data written during this phase next being verified.

Figure 2:
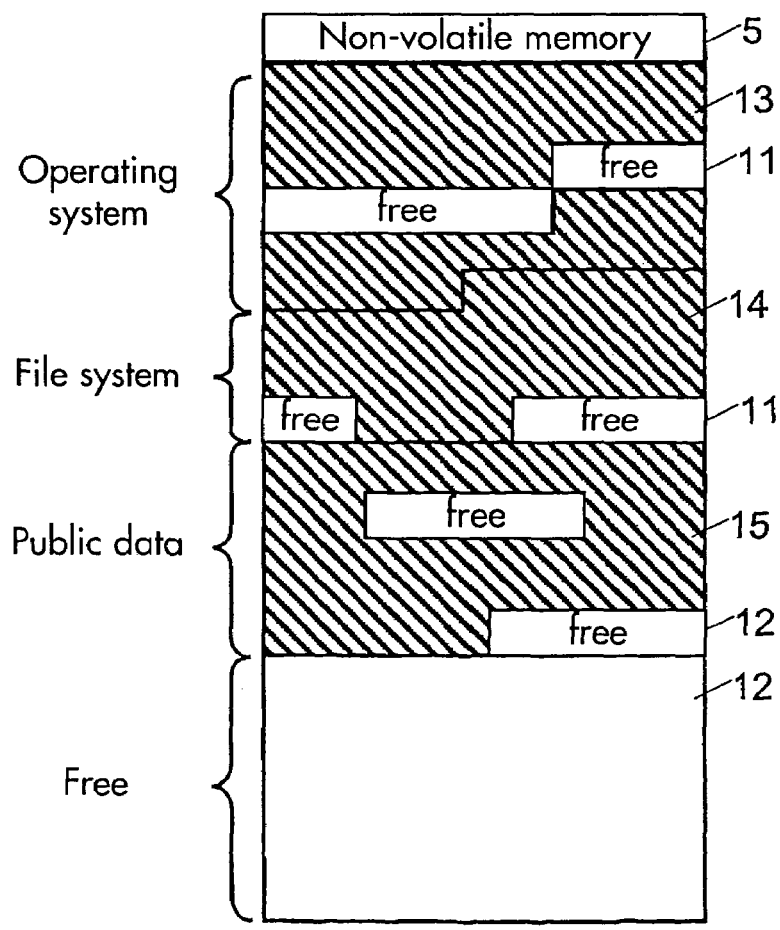
FIG. 2 shows the organisation of the non-volatile memory of the component at the end of phase of loading the non-confidential information.

As shown in FIG. 2, the data loaded during this phase comprise the common or non-confidential parts 13 of an operating system and/or of application programs, a file structure 14, and common or non-confidential information 15, one part 12 of the memory 5 remaining free. In addition, some predefined areas 11 of the memory 5 are left free for the storage of confidential data or programs or those specific to the user for whom the smart card is intended.

Once the common or non-confidential data are loaded into the memory 5, the terminal transmits 23 a phase change command which triggers a process of verification and validation of the data loaded into this memory and then inhibits any further loading of non-confidential information, at least in the same memory area.

This command advantageously comprises a phase change instruction as well as a characteristic value such as a condensed value representing the content of the memory 5, this value being able for example to be obtained by means of a hash function.

If it is wished to authenticate the entity which carried out this loading, the condensed value can be an MAC code. This code can be obtained by means of a so-called hash function in combination with a secret key. It is for example possible to apply the hash function MD5 or SHA-1 (Secure Hash Algorithm-1) making it possible to calculate a binary sequence, for example of 160 bits, representing in a condensed manner the content of the memory 5, such a function being designed so that a slight modification to the content of the memory gives rise to a significant modification to the binary sequence thus calculated.

This phase change command can also be encrypted by means of a secret key, which may be the same as the previous one.

These arrangements guarantee that the information loaded during this phase were loaded by an authorised person. If such is not the case, the loading program does not pass to the following phase and awaits a further loading or phase change command.

On reception of a valid phase change command, the loading program stored in the memory 4 carries out the verification 24 of the content of this memory in order to validate the integrity of all the data which were sent to the component during this phase. This verification comprises first of all the calculation of a characteristic value, applied to all or part of the memory 5. Next, the loading program compares 25 this value thus calculated with a reference value which was transmitted in the phase change command.

If a difference is detected, the first loading phase is considered to have failed and an error code is transmitted to the personalisation terminal. The loading program then returns to step 22. In the contrary case, this loading phase is validated and can be followed by a phase of loading the specific or confidential data.

In the event of failure of the first loading phase, provision can be made for erasing the information which was loaded in order to avoid any risk of fraudulent use of the component.

This verification step guarantees the integrity of the non-confidential data even if the loading was carried out by means of physical commands. As the physical commands are much faster than logic commands, the method according to the invention makes it possible to load the non-confidential data into the memory 5 very quickly.

During the following phase (steps 26 to 29), the specific or confidential data to be loaded into the memory 5 are transmitted 26 to the component one after the other by the personalisation terminal, in the form of write commands which are verified 27 by the microprocessor 2 before being executed.

According to the invention, each write command comprises the value of the data to be written, the address for writing the data in the memory, and the length of the data, as well as a redundancy code if necessary. The whole can be associated with a condensed value characteristic of the command. This condensed value may be a signature.

This signature is for example obtained by means of a hash function. The binary sequence obtained can be encrypted by means of a key, which may be the secret key stored at step 21 in the memory 4, in order to obtain a message authentication code or MAC.

The whole of the command can also be decrypted by means of the secret key or keys installed at step 21.

These arrangements guarantee that the specific or confidential data are loaded by an authorised person.

On reception of a command to write a specific or confidential data item, the microprocessor decrypts the encrypted signature associated with the command received and, if this corresponds to the command received (step 28), proceeds with the writing of the data item associated with the command at the address indicated.

In order to determine whether the signature received corresponds to the write command received, the microprocessor 2 applies the hash function to the command received and compares the signature received and decrypted with the signature thus calculated.

In this way a write command can be executed only if it has previously been signed by means of the secret key and processed by means of the appropriate hash function.

Advantageously, each write command is also associated with a command number which is incremented at each write command, the microprocessor 2 accepting a loading command only if the command number corresponds to the number of the command previously received incremented by one.

During the initialisation phase, provision can be made for loading the respective addresses of the free areas 11, the microprocessor of each write command verifying whether the associated address corresponds to a free area address. These free area addresses can also be loaded in association with a loading command number, the microprocessor also verifying at each write command whether the command number corresponds to the writing address. Provision can also be made for a specific preliminary loading phase triggered at the end of the initialisation phase, during which this information (addresses of the free areas and corresponding loading command numbers) are transmitted in a secure manner to the microprocessor 2 in order to be stored in the non-volatile memory 5.

In this way it is ensured that the free areas 11 of the memory 5 can be filled only in a predefined order.

Once all the data to be loaded have been transmitted to the card and stored by the microprocessor 2 in the memory 5, the terminal transmits to the card an end of phase command preferably containing a phase number. This command can also be encrypted and transmitted to the microprocessor 2 in the form of an MAC signature and comprise a command number which corresponds to the number of the last loading command transmitted, incremented by one.

The reception 30 of such a phase change message triggers the activation 31 of the application program by the microprocessor. The latter can therefore no longer receive loading commands.

Provision can advantageously be made for several data loading cycles each comprising a free personalisation phase (steps 22 to 25) and a confidential personalisation phase (steps 26 to 30). In this case, it is preferable to use several memories and to divide the memory 5 into separate partitions, each memory or partition being completely filled during a loading cycle. This arrangement is necessary for example when the loading of the data must be carried out by several entities.

It suffices for this purpose for the program for loading into the memory 4 to be designed to load only a first partition by executing steps 22 to 30, and for the data loaded during the first cycle to include the loading of a second loading program specifically designed to load only the second partition, this program being activated following the reception by the microprocessor of a phase change command at the end of the secure personalisation phase of the first partition. Several loading cycles comprising the execution of steps 22 to 30 can thus be concatenated, the reception of the phase change command at the end of the last cycle triggering the activation of the application program.

According to one particularity of the invention, the method uses an encryption key for the secure personalisation command, specific to each entity carrying out the loading of part of the memory 5.

Naturally, in order to load the various partitions of the memory 5, it is possible to use only one loading program, namely the one which is stored in the memory 4. It is then necessary, before executing a loading command, to check that the loading request relates to addresses belonging to the partition corresponding to the current loading cycle. A change in cycle triggering a modification to the address field to be loaded. It is also possible to provide for the loading commands of the second phase to be logic commands.

The invention claimed is:

1. A method for loading information into a portable electronic device containing a microprocessor and memory, comprising the following steps:

loading non-confidential information into said memory;
   issuing an end-of-loading command upon completion of the loading of the non-confidential information into said memory;
   in response to said end-of-loading command, validating the content of the non-confidential information loaded into said memory;

in response to a determination that the non-confidential information loaded into said memory was successfully validated, issuing commands to load confidential information into said memory;

in response to receipt of each issued command, verifying the command, wherein verification of each issued command comprises determining whether an address associated with the write command corresponds to an address of a predefined area in memory for storing confidential information; and upon verification of an issued command, loading the confidential information associated with the issued command into the predefined area of memory.

2. The method of claim 1, wherein the step of loading non-confidential information is performed by means of physical write commands which designate address locations within the memory.

3. The method of claim 2, further including the step of inhibiting the loading of any further information to said designated address locations in response to a determination that the non-confidential data was successfully validated.

4. The method of claim 1, wherein the end-of-loading command includes a value that represents the content of the non-confidential information loaded in the memory, and wherein the step of validating the non-confidential information comprises calculating a characteristic value from the non-confidential information stored in the memory, and comparing said calculated value with the representative value included with the end-of-loading command.

5. The method of claim 1 wherein each issued command is accompanied by a confidential signature that authenticates the command, and the step of verifying a command includes calculating a signature from a received command, and comparing the calculated signature with the signature that accompanied the command.

6. The method of claim 1, wherein each command to load confidential information includes a memory address to which its associated confidential data is to be written, and the step of verifying a command includes determining whether the address in the command corresponds to a stored indication of an address at which the confidential information for the command is to be stored.

7. The method of claim 1, wherein the step of loading non-confidential information into the memory comprises loading information common to an operating system, a file structure and/or application programs.

8. The method of claim 1, wherein the step of loading confidential information into the memory comprises loading data and/or programs specific to the user for whom the portable electronic device is intended.

9. The method of claim 1, wherein the loading of non-confidential information into said memory further comprises loading the non-confidential information in a respective memory area distinct from the predefined area of memory in which confidential information is loaded.

10. A method for loading information into a portable electronic device containing a microprocessor and memory, comprising the following steps:

loading non-confidential information into said memory by means of physical commands that designate physical addresses in said memory;

in response to completion of the loading of the non-confidential information, validating the content of the non-confidential information loaded into said memory;

in response to a determination that the non-confidential information was successfully validated, issuing commands to load confidential information into memory, wherein each individual command includes a confidential signature that authenticates the command and a command number that verifies a memory address for loading the confidential information;

in response to receipt of each issued command, verifying the authenticity of the command based upon its signature and verifying the memory address for loading the confidential information; and upon verification of the authenticity of the command and the memory address loading the confidential information associated with the command into the memory.

11. The method of claim 10, further including the step of inhibiting the loading of any further information to said designated address locations in response to a determination that the non-confidential data was successfully validated.

12. The method of claim 10, wherein each command includes a memory address to which its associated confidential data is to be written, and the step of verifying a command further includes determining whether the address in the command corresponds to a stored indication of an address at which the confidential information for the command is to be stored.

13. The method of claim 10, wherein verification of the memory address for loading the confidential information is performed by determining whether the command number corresponds to a pre-loaded free address.

14. The method of claim 13, wherein the pre-loaded free address is stored in memory during an initialization phase.

* * * * *